US010626031B2

(12) United States Patent
Eyster et al.

(10) Patent No.: US 10,626,031 B2
(45) **Date of Patent: *Apr. 21, 2020**

(54) TREATMENT OF SLUDGES AND FLOCCULANTS USING INSOLUBLE MINERAL COLLOIDAL SUSPENSIONS

(71) Applicant: Heritage Research Group, Indianapolis, IN (US)

(72) Inventors: Perry Eyster, Brownsburg, IN (US); Bynum Henson, Fishers, IN (US); Christopher D. Weber, Greenwood, IN (US)

(73) Assignee: Heritage Research Group, Indianapolis, IN (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/685,174

(22) Filed: Aug. 24, 2017

(65) Prior Publication Data

US 2018/0057375 A1 Mar. 1, 2018

Related U.S. Application Data

(60) Provisional application No. 62/399,899, filed on Sep. 26, 2016, provisional application No. 62/379,014, filed on Aug. 24, 2016.

(51) Int. Cl.

| | |
|---|---|
| ***C02F 1/52*** | (2006.01) |
| ***B01D 21/26*** | (2006.01) |
| ***C02F 11/14*** | (2019.01) |
| ***C02F 11/143*** | (2019.01) |
| ***C02F 11/145*** | (2019.01) |
| ***C02F 1/02*** | (2006.01) |
| ***C02F 1/38*** | (2006.01) |
| *C02F 11/148* | (2019.01) |
| *C02F 11/127* | (2019.01) |
| *C02F 103/36* | (2006.01) |

(52) U.S. Cl.

CPC .......... *C02F 1/5245* (2013.01); *B01D 21/262* (2013.01); *C02F 1/02* (2013.01); *C02F 1/385* (2013.01); *C02F 11/14* (2013.01); *C02F 11/143* (2019.01); *C02F 11/145* (2019.01); *C02F 1/5236* (2013.01); *C02F 11/127* (2013.01); *C02F 11/148* (2019.01); *C02F 2103/365* (2013.01)

(58) Field of Classification Search

None

See application file for complete search history.

(56) References Cited

U.S. PATENT DOCUMENTS

| | | | | |
|---|---|---|---|---|
| 4,037,781 A * | 7/1977 | High | B04B 1/20 | 494/51 |
| 4,559,143 A * | 12/1985 | Asada | B01D 37/02 | 210/714 |
| 4,814,092 A * | 3/1989 | Patzelt | B01D 17/00 | 210/708 |
| 4,830,754 A * | 5/1989 | Nowak | B01D 17/042 | 210/639 |
| 4,839,022 A * | 6/1989 | Skinner | B01D 17/00 | 208/13 |
| 5,098,584 A * | 3/1992 | Leen | B01D 37/00 | 210/768 |
| 5,674,402 A | 10/1997 | Nilsson et al. | | |
| 5,853,677 A * | 12/1998 | Avotins | B01D 21/01 | 423/121 |
| 5,958,241 A * | 9/1999 | DeBenedetto | C02F 1/24 | 210/611 |
| 6,132,630 A * | 10/2000 | Briant | B01D 17/00 | 210/774 |
| 2002/0088758 A1 | 7/2002 | Blumenschein et al. | | |
| 2005/0016919 A1* | 1/2005 | Hagino | C02F 1/5254 | 210/613 |
| 2010/0224577 A1* | 9/2010 | Ball | C02F 1/001 | 210/803 |
| 2011/0089109 A1 | 4/2011 | Ulmert et al. | | |
| 2013/0240442 A1 | 9/2013 | Chidambaran et al. | | |
| 2013/0313199 A1 | 11/2013 | Marcin et al. | | |
| 2015/0096925 A1* | 4/2015 | Hines | B03D 1/01 | 209/164 |

OTHER PUBLICATIONS

FloMag (p. 1, published Jan. 28, 2015). (Year: 2015).*

Qiao et al. (Journal of Material Science, 2008, 7, 2431-2436). (Year: 2008).*

International Search Report and Written Opinion from corresponding PCT application No. PCT/US2017/048333 dated Dec. 5, 2017 (12 pgs).

International Preliminary Report on Patentability t and Written Opinion from corresponding PCT application No. PCT/US2017/048333 dated Mar. 7, 2019 (9 pgs).

* cited by examiner

*Primary Examiner* — Clare M Perrin

(74) *Attorney, Agent, or Firm* — Woodward, Emhardt, Henry, Reeves & Wagner, LLP

(57) ABSTRACT

A method of separating sludge which involves adding an insoluble mineral colloidal suspension into an industrial sludge to destabilize the industrial sludge and separating destabilized components of the industrial sludge. The insoluble mineral colloidal suspension includes magnesium hydroxide. In an alternative embodiment dry finely divided magnesium hydroxide can be added and then dispersed into an industrial sludge. Conventional flocculants and/or coagulants can also be added. Conventional physical separation processes can be used to separate the destabilized industrial sludge.

13 Claims, No Drawings

TREATMENT OF SLUDGES AND FLOCCULANTS USING INSOLUBLE MINERAL COLLOIDAL SUSPENSIONS

RELATED APPLICATION

This application is based upon U.S. Provisional Application Ser. No. 62/379,014, filed Aug. 24, 2016 and U.S. Provisional Application Ser. No. 62/399,899, filed Sep. 26, 2016 to each of which priority is claimed under 35 U.S.C. § 120 and of each of which the entire specification is hereby expressly incorporated by reference.

BACKGROUND

The present invention relates generally to separating sludges and more particularly to the use of insoluble magnesium hydroxide colloidal suspensions that can be added to sludges and/or floats to aid in separation.

The wastewater produced from different kinds of industries normally contains very fine suspended solids, dissolved solids, inorganic and organic particles, metals and other impurities. Due to very small size of the particles and presence of surface charge, the task to bring these particles closer to make heavier mass for settling and filtration becomes challenging.

Petroleum refining generates large volumes of oily wastewater. With industrial development, there is increase in the amount of oil used. Oil refining, oil storage, transportation and petrochemical industries in the production process generate a lot of oily wastewater.

Separating sludge increases recycled content, reduces the overall volume of waste generated as well as increases the outlets available for disposal. Industrial wastewater sludges are often difficult to separate due to relative density of the components as well as particle size and charge distribution. For example, refinery sludge becomes increasingly difficult to process as the inorganic content of the crude slate increases. Various processes throughout refineries increase both the organic content in the form of polymer flocculants and the inorganic content captured by the flocculants.

The low density of particulates in sludge combined with the low density of the accumulated spent flocculants and the increased density of the water component, with high dissolved solids, results in poor separation.

Various traditional and advanced technologies have been utilized to remove the colloidal particles from wastewater; such as ion exchange, membrane filtration, precipitation, flotation, solvent extraction, adsorption, coagulation, flocculation, biological and electrolytic methods.

Traditional approaches include the addition of bentonite, lime, ferric compounds, or varying combinations of expensive coagulants and flocculants. These are often ineffective or require significant dosing rates.

Petroleum refiners use Dissolved Nitrogen Floatation (DNF) units for clarifying wastewater from a variety of refining processes that include washing from a desalter and other wastewater generated processes within a refinery.

DNF units force nitrogen under pressure in the form of microscopic bubbles often with a coagulant additive to float particulate matter that has densities near that of water to the top of the unit where they are skimmed off. Solids that are higher in density sink to the bottom where they are collected separately. The middle phase which is absent of solids is sent to wastewater treatment for processing before discharge.

The DNF bottom sludge and top float are often combined for further treatment. According to one aspect the present invention relates to processing of the combined DNF sludge and float.

Coagulation is the destabilization of colloidal particles brought about by the addition of a chemical reagent known as a coagulant. Flocculation is the agglomeration of destabilized particles into microfloc, and later into bulky floccules which can be settled called floc.

Coagulation is the process by which colloidal particles and very fine solid suspensions initially present in a wastewater stream are combined into larger agglomerates that can be separated by means of sedimentation, flocculation, filtration, centrifugation, or other separatory methods. This involves a chemical process in which destabilization of non-settleable particles is realized. These non-settleable particles can include most colloids as well as extremely small solid particles and all solvated (dissolved) particles. These particles form clumps with the help of a coagulant. Coagulation is commonly achieved by adding different types of chemicals (coagulants) to a wastewater stream to promote destabilization of any colloid dispersion present and the agglomeration of the individual resultant colloidal particles. Coagulation is the destabilization of these colloids by neutralizing the electrostatic forces that keep them apart. Cationic coagulants provide positive electrostatic charges to reduce the negative electrostatic charges (zeta potential) of the colloids. As a result, these particles collide to form these larger floc particles.

Flocculation refers to the coming together of particles by means of a physical or mechanical process resulting in the joining together of large aggregated clumps (or flocs) to form larger masses and eventually to precipitate them from the liquid phase and thereby convert them into the solid phase for further separation. In coagulation, these forces responsible for keeping the particles suspended and dispersed after they contact each other are reduced. This is usually referred to as collapsing the colloid and/or precipitate formation in the case of solvated particles. Flocculation joins these de-established colloidal dispersions into large aggregates that enter the solid phase.

According to the present invention the addition of insoluble mineral colloidal suspensions in DNF sludges and floats is used to destabilize DNF sludge and/or float wastes for purposes of separation and component recovery. Further, these materials have improved separation in DNF, Dissolved Air Flotation (DAF), and American Petroleum Institute Separator (API Separator), and tank clean-out sludges.

BRIEF SUMMARY

According to various features, characteristics and embodiments of the present invention which will become apparent as the description thereof proceeds, the present invention provides a method of separating sludges which comprises:

obtaining an industrial sludge;

adding an insoluble magnesium hydroxide colloidal suspension into the industrial sludge to destabilize the industrial sludge; and separating destabilized components of the industrial sludge.

The present invention further provides an improvement in processes for physically separating components of a sludge which improvement comprises adding insoluble magnesium hydroxide colloidal suspension into the sludge prior to physically separating components of the sludge.

DETAILED DESCRIPTION OF THE DRAWINGS AND THE PRESENTLY PREFERRED EMBODIMENTS

The present invention relates generally to separating sludges and more particularly to the addition of insoluble magnesium hydroxide colloidal suspensions to DNF, DAF, and API sludges, and other sludge wastes for purposes of separation and component recovery.

The insoluble colloidal magnesium hydroxide suspension used in the present invention can be obtained from mined sources or formed by precipitation and added as a colloidal suspension to sludges and/or floats. Those familiar with the art will understand the benefits of using these materials to destabilize various types of sludge including DNF, DAF, API, and other sludge and/or float wastes.

According to one aspect the present invention involves the introduction of magnesium hydroxide to process sludges which acts to inhibit the effect of accumulated spent flocculent and increase the density of new flocculent such that traditional processing equipment can be used to more effectively process sludges.

The use of magnesium hydroxide allows the introduction and/or formation of stable and pumpable, high concentration suspensions without detrimentally altering pH or significantly increasing total solids content. The low solubility results in a diffuse solids component with suitable charge that adds density to the floc and allows for easy settling or centrifugation from the water and oil components of the sludges.

Adding an insoluble colloidal magnesium hydroxide suspension into an industrial sludge according to the present invention causes colloidal particles and very fine solid suspensions initially present in the industrial sludge to combine into larger agglomerates that can be separated by means of sedimentation, flocculation, filtration, centrifugation, or other separatory methods.

The insoluble colloidal magnesium hydroxide suspensions of the present invention can include mined material suspended in an aqueous solution or precipitated from soluble compounds to yield suspended solids.

The insoluble colloidal mineral suspensions used in the present invention can have as little of 25% percent solids by weight and up to 65% percent solids by weight with about 50-60% solids by weight being generally suitable for purposes of the present invention. In an alternative embodiment to adding an insoluble colloidal mineral suspension to a sludge dry solids of finely divided magnesium hydroxide can be added to the sludge and then dispersed. However this alternative does not afford the ease of addition or certainty of thorough solids distribution.

While the insoluble colloidal magnesium hydroxide suspension used according to the present invention causes colloidal particles and very fine solid suspensions initially present in an industrial sludge to combine into larger agglomerates, it can be understood that the addition of other known coagulants and/or flocculants can also be used to aid and improve agglomeration and clumping for separation purposes According to the present invention exemplary sludges include industrial wastewater sludges in general, refinery sludges and in particular sludges from processes such as DNF, DAF, API separators, and tank clean-out sludges.

For purposes of the present invention conventional flocculants/coagulants can also be used including mineral, natural and synthetic materials as well as those listed above.

EXAMPLES

The following non-limited Examples are provided to illustrate various features and characteristics of the present invention which are not intended to be specifically limited thereto.

Example 1

In this example DNF sludge and float were transferred from a DNF tank to a smaller tank where a 50-60% solids by weight suspension of magnesium hydroxide was added at 1.75% by volume of the DNF sludge and float. A coagulant (water soluble cationic polymer) was added at 500 parts per million to aid in separation. The combined mixture was heated from ambient temperature to 170° F. The heated material was then fed to a three phase centrifuge to separate clean water (centrate), oils and solids. The centrate had the characteristic of having less than 1% particulate solids and could be sent back (recovered and recycled) to the DNF or sent on to wastewater treatment. The oil could be recovered (and recycled) and the solids could be disposed of.

Example 2

In this example the same procedure in Examples 1 above was followed except 200 ppm of water soluble anionic was added to the sludge and float. The combined mixture was heated from ambient temperature to 170° F. The heated material was then fed to a three phase centrifuge to separate clean water (centrate), oils and solids. The centrate had the characteristic of having less than 1% particulate solids and could be sent back (recovered and recycled) to the DNF or sent on to wastewater treatment. The oil could be recovered (and recycled) and the solids could be disposed of.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A method of separating sludges which comprises:

obtaining an industrial sludge comprising a mixture of an oil, water, and suspended particles;

adding an insoluble magnesium hydroxide colloidal suspension into the industrial sludge;

permitting the formation of an agglomeration comprising the suspended particles and magnesium hydroxide; and separating each of the agglomeration, the oil, and the water with a process consisting essentially of three-phase centrifugation.

2. A method of separating sludges according to claim 1, wherein a flocculant and/or coagulant is added to the industrial sludge to aid in the formation of the agglomeration.

3. A method of separating sludges according to claim 1, wherein the industrial sludge is a waste water sludge.

4. A method of separating sludges according to claim 1, wherein the industrial sludge is refinery sludge.

5. A method of separating sludges according to claim 1, wherein the industrial sludge is a combined bottom sludge and top float.

6. A method of separating sludges according to claim 1, wherein the insoluble magnesium hydroxide colloidal suspension has a solids percent by weight of at least 25%.

7. A method of separating sludges according to claim 1, wherein the insoluble mineral colloidal suspension has a solids percent of up to 65%.

8. A method of separating sludges according to claim 1, wherein the insoluble mineral colloidal suspension has a solids percent by weight that ranges from 25% to 65%.

9. The method of claim 1, further comprising adding at least one coagulant to the industrial sludge.

10. The method of claim 9, wherein the agglomeration further comprises the coagulant.

11. The method of claim 10, wherein the at least one coagulant comprises a cationic coagulant.

12. The method of claim 1, wherein the oil comprises a petroleum oil.

13. The method of claim 1, further comprising heating the industrial sludge after addition of the insoluble magnesium hydroxide colloidal suspension to a temperature greater than ambient temperature.

* * * * *

UNITED STATES PATENT AND TRADEMARK OFFICE
CERTIFICATE OF CORRECTION

PATENT NO. : 10,626,031 B2
APPLICATION NO. : 15/685174
DATED : April 21, 2020
INVENTOR(S) : Perry Eyster It is certified that error appears in the above-identified patent and that said Letters Patent is hereby corrected as shown below:

In the Claims

Column 4, Claim 2, Lines 61-63, replace "2. A method of separating sludges according to claim 1, wherein a flocculant and/or coagulant is added to the industrial sludge to aid in the formation of the agglomeration." with --2. A method of separating sludges according to claim 1, wherein at least one of a flocculant or a coagulant is added to the industrial sludge to aid in the formation of the agglomeration.--

Column 5, Claim 7, Lines 7-9, replace "7. A method of separating sludges according to claim 1, wherein the insoluble mineral colloidal suspension has a solids percent of up to 65%." with --7. A method of separating sludges according to claim 1, wherein the insoluble magnesium hydroxide colloidal suspension has a solids percent of up to 65%.--

Column 5, Claim 8, Lines 10-12, replace "8. A method of separating sludges according to claim 1, wherein the insoluble mineral colloidal suspension has a solids percent by weight that ranges from 25% to 65%." with --8. A method of separating sludges according to claim 1, wherein the insoluble magnesium hydroxide colloidal suspension has a solids percent by weight that ranges from 25% to 65%.--

Signed and Sealed this
Seventh Day of July, 2020

Andrei Iancu
*Director of the United States Patent and Trademark Office*